(12) United States Patent
Sapir et al.

(10) Patent No.: US 12,470,589 B2
(45) Date of Patent: Nov. 11, 2025

(54) SYSTEMS AND METHODS FOR RISK ASSESSMENT OF USER ACCESSES TO DATA RESOURCES

(71) Applicant: Dell Products, L.P., Round Rock, TX (US)

(72) Inventors: Stav Sapir, Beer Sheba (IL); Igor Dubrovsky, Beer Sheva (IL); Boris Shpilyuck, Ashdod (IL)

(73) Assignee: Dell Products, L.P., Round Rock, TX (US)

( * ) Notice: Subject to any disclaimer, the term of this patent is extended or adjusted under 35 U.S.C. 154(b) by 124 days.

(21) Appl. No.: 18/488,232

(22) Filed: Oct. 17, 2023

(65) Prior Publication Data
US 2025/0126145 A1 Apr. 17, 2025

(51) Int. Cl.
*H04L 9/40* (2022.01)

(52) U.S. Cl.
CPC ........ *H04L 63/1433* (2013.01); *H04L 63/105* (2013.01); *H04L 63/1416* (2013.01)

(58) Field of Classification Search
CPC H04L 63/1433; H04L 63/105; H04L 63/1416
USPC ........................................ 726/22, 23, 24, 26
See application file for complete search history.

(56) References Cited

U.S. PATENT DOCUMENTS

| | | | |
|---|---|---|---|
| 9,973,525 B1* | 5/2018 | Roturier | H04L 63/1433 |
| 10,728,262 B1* | 7/2020 | Vaswani | G06F 21/62 |
| 10,887,325 B1* | 1/2021 | Lin | G06N 20/00 |
| 11,640,470 B1* | 5/2023 | Amar | G06Q 10/0635 726/22 |
| 11,651,313 B1 | 5/2023 | Fridakis | |
| 2020/0053111 A1* | 2/2020 | Jakobsson | H04L 63/1416 |
| 2021/0084063 A1* | 3/2021 | Triantafillos | H04L 67/535 |

* cited by examiner

*Primary Examiner* — Teshome Hailu
(74) *Attorney, Agent, or Firm* — Fogarty LLP (57) ABSTRACT

Systems and methods for risk assessment of user accesses to data resources are described. In an illustrative, non-limiting embodiment, an Information Handling System (IHS) may include: a processor; and a memory coupled to the processor, where the memory includes program instructions store thereon that, upon execution by the processor, cause the IHS to: obtain a plurality of resource risk weights of a respective plurality of resources, and a plurality of access permissions of a user for the respective plurality of resources; and generate based, at least in part, on the plurality of resource risk weights and the plurality of access permissions of the user, a risk score for the user that represents a level of security impact of the user on the plurality of resources.

18 Claims, 7 Drawing Sheets

Obtain resource risk weights of resources, and access permissions of a user for the resources, where a resource risk weight is an integer number representing a sensitivity of a corresponding resource, and an access permission is information regarding whether the user is capable of accessing, creating, reading, updating or deleting the corresponding resource.
710

Generate based, at least in part, on the access permissions of the user, permission factors, where an individual permission factor is an integer number representing a type of access permission of the user for the corresponding resource.
720

Determine access risks for the user with respect to the respective resources, wherein an individual access risk is determined by multiplying a resource risk weight of a resource with a permission factor of the corresponding resource.
730

Generate a risk score for the user based, at least in part, on the mean or median of the access risks for the user, where the risk score represents a level of security impact of the user on the resources.
740

Perform one or more responsive actions based, at least in part, on the generated risk score for the user.
750

FIG. 7

SYSTEMS AND METHODS FOR RISK ASSESSMENT OF USER ACCESSES TO DATA RESOURCES

FIELD

This disclosure relates generally to Information Handling Systems (IHSs), and more specifically, to systems and methods for risk assessment of user accesses to data resources.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

In recent years, more and more computing applications are being implemented in distributed environments. A given distributed application may, for example, utilize numerous physical and/or virtualized servers spread among several data centers of a provider network, and may serve customers in many different geographical locations. A large corporation or government entity may utilize the resources of one or more cloud infrastructure providers for many different applications, with at least some of the applications interacting with each other and with other applications being run on customer-owned premises. Many such applications may deal with highly confidential data resources, such as financial records, health-related records, intellectual property assets, and the like.

As evidenced by the increasing number of recent news reports regarding successful network-based attacks on various businesses, the need for better approaches towards preventing the theft or misuse of business-critical or confidential data continues to grow. Some existing techniques, such as the deployment of virus-scanning software on an enterprise's computer systems, or the enforcement of requirements for non-trivial passwords, address small partitions of the data security problem space. However, especially in environments in which some of the security-sensitive assets may be stored in virtualization-based cloud environments, many organization managers may be unaware of all the types of vulnerabilities that may apply to their assets.

SUMMARY

Systems and methods for risk assessment of user accesses to data resources are described. In an illustrative, non-limiting embodiment, an Information Handling System (IHS) may include: a processor; and a memory coupled to the processor, where the memory includes program instructions store thereon that, upon execution by the processor, cause the IHS to: obtain a plurality of resource risk weights of a respective plurality of resources, and a plurality of access permissions of a user for the respective plurality of resources; and generate based, at least in part, on the plurality of resource risk weights and the plurality of access permissions of the user, a risk score for the user that represents a level of security impact of the user on the plurality of resources.

In some embodiments, the program instructions, upon execution by the processor, further cause the IHS to: perform one or more responsive actions based, at least in part, on the generated risk score. In some embodiments, the one or more responsive actions are performed responsive to a detection of a security event or a data compromise. In some embodiments, the one or more responsive actions include recommending that extra authentication levels be added for the user, or recommending that additional monitoring be performed on the user. In some embodiments, the one or more responsive actions include an initiation a detailed verification procedure to confirm the presence of the threat. In some embodiments, the one or more responsive actions include a disabling of one or more network paths used to access one or more of the plurality of resources. In some embodiments, the one or more responsive actions include a changing of one or more of the plurality of access permissions of the user for one or more of the plurality of resources, or a revocation of access rights of the user to one or more of the plurality of resources. In some embodiments, the one or more responsive actions include a transmission of one or more warnings to the user or to a system administrator.

In some embodiments, the risk score identifies one or more resources of the plurality of resources to prioritize for one or more responsive actions. In some embodiments, an individual resource risk weight of the plurality of resource risk weights includes an integer number representing a sensitivity of a corresponding resource of the plurality of resources. In some embodiments, an individual access permission of the plurality of access permissions for a resource of the plurality of resources includes information regarding whether the user is capable of accessing, creating, reading, updating or deleting the resource.

In some embodiments, to generate the risk score for the user, the program instructions, upon execution by the processor, further cause the IHS to: generate based, at least in part, on the plurality of access permissions of the user, a plurality of permission factors, where an individual permission factor includes an integer number representing a type of access permission of the user for a respective resource of the plurality of resources, and where the risk score is generated based, at least in part, on the plurality of permission factors. In some embodiments, to generate the risk score for the user, the program instructions, upon execution by the processor, further cause the IHS to: determine a plurality of access risks for the user with respect to the respective plurality of resources; and generate the risk score for the user based, at least in part, on the mean or median of the plurality of access risks for the user. In some embodiments, an individual access risk of the plurality of access risks is determined by multiplying a resource risk weight of a respective resource with a permission factor of the respective resource.

In another illustrative, non-limiting embodiment, a method includes: obtaining a plurality of resource risk weights of a respective plurality of resources, and a plurality of access permissions of a user for the respective plurality of resources; and generating based, at least in part, on the plurality of resource risk weights and the plurality of access permissions of the user, a risk score for the user that represents a level of security impact of the user on the plurality of resources.

In some embodiments, the method further includes: detecting a security event or a data compromise; and responsive to the detecting, performing one or more responsive actions based, at least in part, on the generated risk score. In some embodiments, performing the one or more responsive actions further includes performing one or more of: adding authentication levels for the user; performing additional monitoring on the user; initiating a detailed verification procedure to confirm the presence of the threat; disabling of one or more network paths used to access one or more of the plurality of resources; changing one or more of the plurality of access permissions of the user for one or more of the plurality of resources; revoking access rights of the user to one or more of the plurality of resources; or transmitting one or more warning to the user or to a system administrator.

In some embodiments, generating the risk score for the user further includes: generating based, at least in part, on the plurality of access permissions of the user, a plurality of permission factors, where an individual permission factor includes an integer number representing a type of access permission of the user for a respective resource of the plurality of resources; determining a plurality of access risks for the user with respect to the respective plurality of resources, where an individual access risk of the plurality of access risks is determined by multiplying a resource risk weight of a respective resource with a permission factor of the respective resource; and generating the risk score for the user based, at least in part, on the mean or median of the plurality of access risks for the user.

In another illustrative, non-limiting embodiment, one or more non-transitory computer-readable storage media store program instructions, that when executed on or across one or more processors, cause the one or more processors to: obtain a plurality of resource risk weights of a respective plurality of resources, and a plurality of access permissions of a user for the respective plurality of resources; and generate based, at least in part, on the plurality of resource risk weights and the plurality of access permissions of the user, a risk score for the user that represents a level of security impact of the user on the plurality of resources.

In some embodiments, the program instructions further cause the one or more processors to: perform one or more responsive actions based, at least in part, on the generated risk score.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
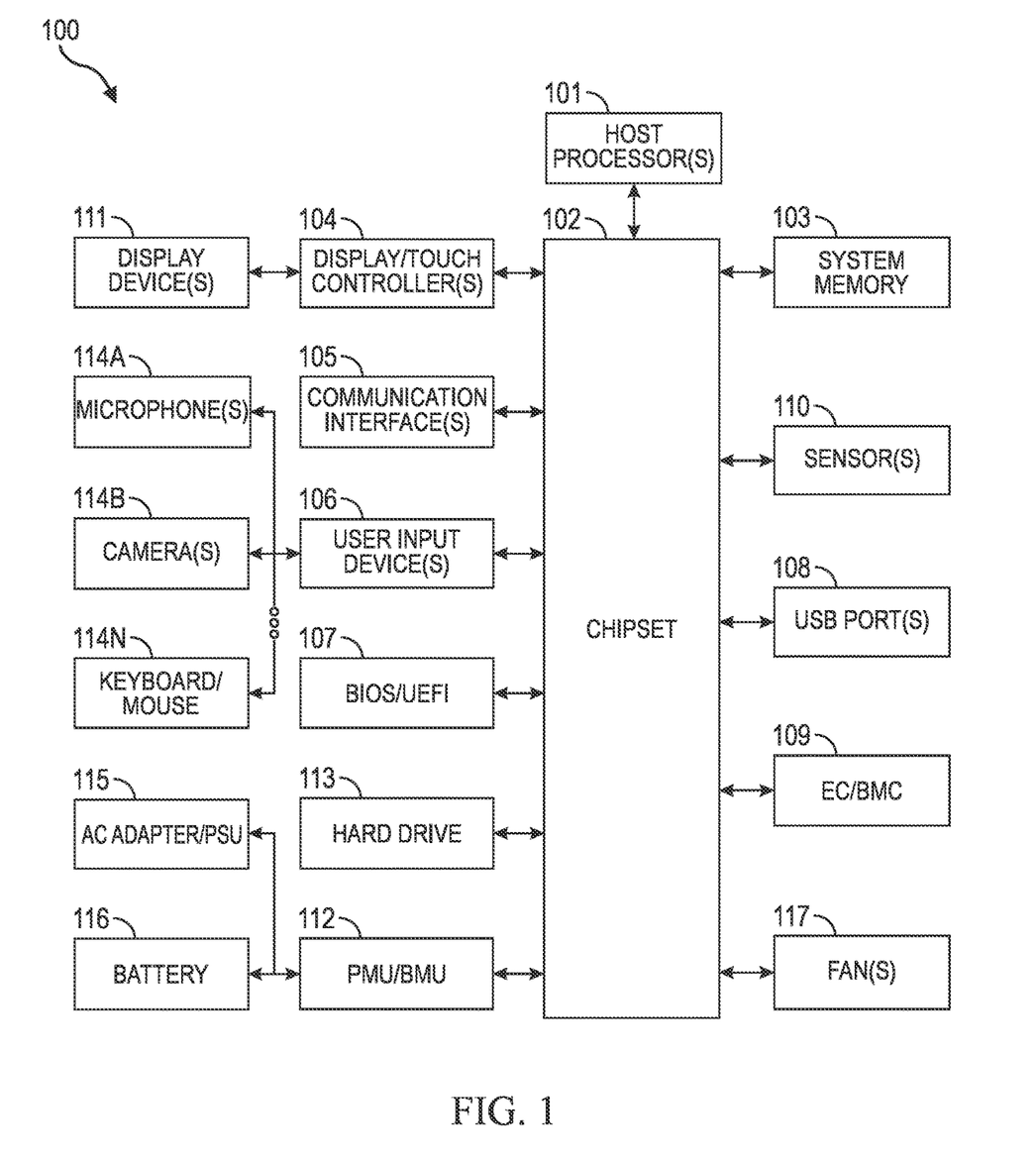
FIG. 1 is a diagram illustrating examples of hardware components of an Information Handling System (IHS), according to some embodiments.

FIG. 1 is a block diagram of hardware components of IHS 100, which may be used to implement the systems and methods for risk assessment of user accesses to data resources.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time- Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS for use by IHS 100. BIOS 107 provides an abstraction layer that allows host OS to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

An access system controls the level of access that users have to a particular system or network. Access control refers to the mechanisms and processes implemented to regulate and manage user access to computer systems, networks, data, and resources. Access control is a fundamental aspect of information security, aiming to protect sensitive information and prevent unauthorized access or malicious activities.

Role-Based Access Control ("RBAC") is widely used access control model in the field of cybersecurity. It provides a structured approach to managing and enforcing access permissions within an organization's information systems. RBAC is designed to simplify access control administration, improve security, and support least privilege principles. For RBAC, users are typically assigned permissions based on their role or job function within an organization. These permissions determine what actions a user can take within the system, such as reading, writing, or executing certain files. Any subset of permission has different implications if your identity is stolen or compromised.

In complex systems, users might be granted a lot of permissions. This makes the task of identifying the impact of a compromised user a hard problem to solve. In order to assess and define fine-tuned access controls, there is a need to quickly identify and classify users that possess a risky subset of permissions in terms of the business impact. Since permissions give access to resources, each type of resource might have a different value in terms of business impact, for example full create, read, update and delete ("CRUD") access to financial reports versus only the ability to view logs has a different impact in case of a user or identity compromise.

Risk assessment involves the systematic identification, analysis, and evaluation of potential risks and vulnerabilities to information systems, networks, and data. It is a crucial process for organizations to understand their security posture, prioritize security investments, and make informed decisions to mitigate risks effectively. There is a need for an automatic risk assessment mechanism that will define a risk/score for a certain identity based on the subset of permissions out of total system permissions.

In any system managing resources with access control, there is a complexity in evaluating the risk associated with a compromised user, considering the data or abilities that may be exposed when the user is compromised. In addition to the evaluation, an organization might want to take additional steps for high-risk users. These steps include prioritizing response actions in the event that a high-risk user is compromised, and swiftly identifying the potentially exposed data to determine appropriate incident mitigation measures.

Performing such tasks statically during role creation can be time-consuming, and every access control management system is characterized by constantly changing dynamics due to the growth of data resources, evolution of system functionality and the evolution of user roles. This makes the task of keeping up with continuous evaluations cumbersome.

In various embodiments, systems and methods described herein can solve these and other problems by providing a risk assessment of user accesses to data resources. Specifically, such embodiments can enable a well-defined risk assessment of user permissions. Some of these embodiments can enable this risk assessment in real time. Some embodiments can enable a visibility to access control remediation with minimal business disruption. Some embodiments can enable a more efficient cyber event investigation and prioritization based on user risk assessment and the accessible resources at the time of the event. Some embodiments provide the ability to understand the impact of a compromised user to decide on the event severity and mitigation steps.

Figure 2:
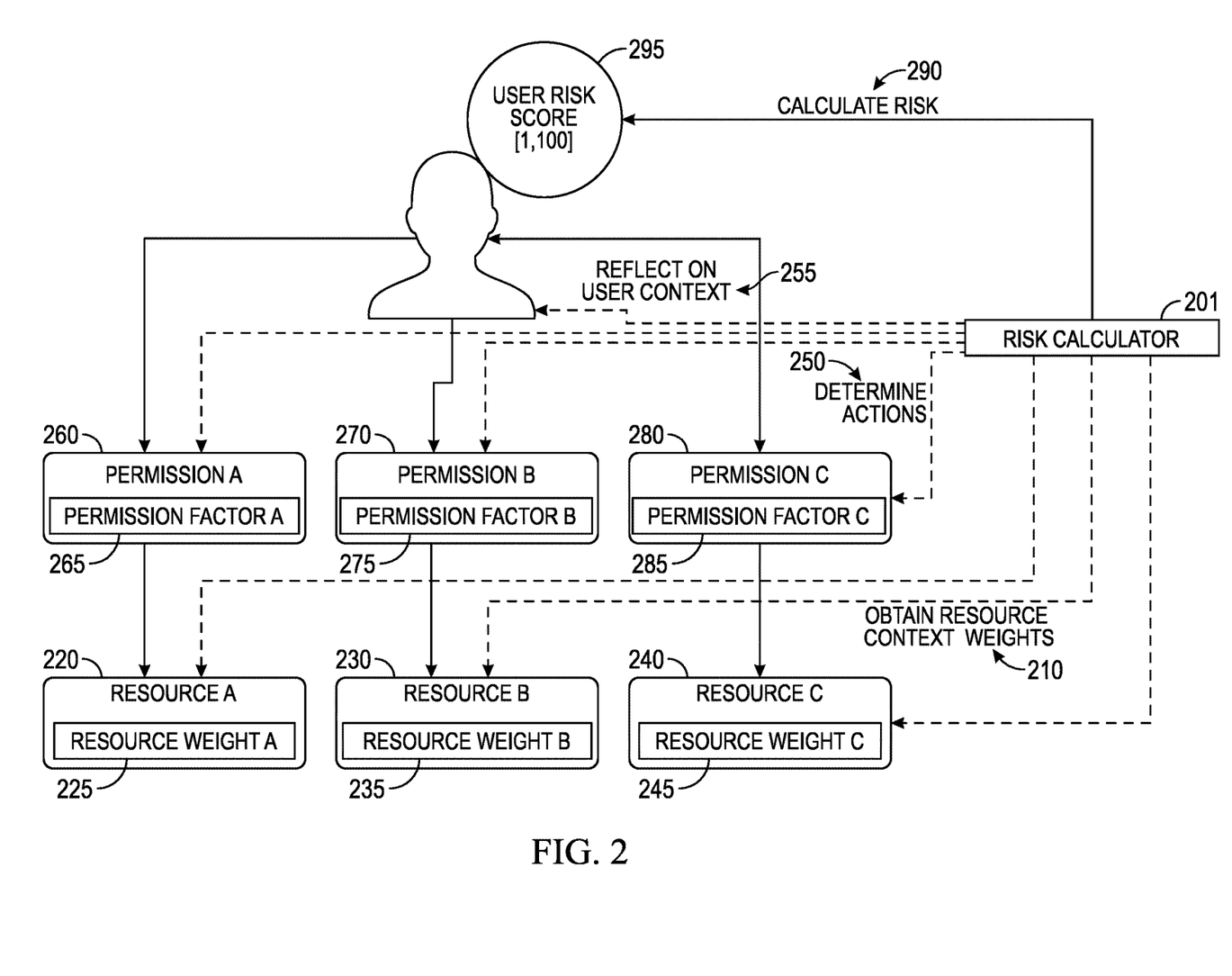
FIG. 2 is a diagram illustrating an example of a method for risk assessment of user accesses to data resources, according to some embodiments.

FIG. 2 is a diagram illustrating an example of a method for risk assessment 295 of user accesses to data resources (220, 230, 240), according to some embodiments. Risk can be defined in terms of enumerated values such as "Critical", or "High", etc., or it can be defined as a numeric score in a certain range, for example [0-100]. The selection of a representation depends on the controls one wants to implement.

The risk/score can consist of the "weight" (225, 235, 245) of a security impact of the resources (220, 230, 240) and the permissions (260, 270, 280) granted on the resources. A risk calculator 201 can obtain 210 resource context weights from the resources (220, 230, 240). For example, each resource type (220, 230, 240) can be tagged with a weight score (225, 235, 245) regarding its confidentiality relevant information. The resource weight can be defined as a numeric score in a certain range, for example [1,X]. It can be an integer number set to represent the risk weight of the resource. The higher the number the riskier is the resource in overall business view in case of compromise. This logic can then be expanded to all Confidentiality, Integrity, and Availability ("CIA") domains.

The risk calculator 201 can determine actions 250 that are permitted by a user, and assign permission factors (265, 275, 285) to the permissions (260, 270, 280). A permission factor can be defined as a numeric score in a certain range, for example [1,X]. It can be a continuous value. This value can indicate the weight of the permission on the resource, for example the permission to modify can have higher value than the permission to view.

The risk calculator can then reflect on user context 255 to determine the access risk of user permission on a resource. The access risk can be the total weight of a certain permission that takes into account which actions are permitted on the resource and the resource security score. The access risk can be calculated, in some embodiments, as the product of (Permission factor*Resource weight).

Then risk calculator 201 can calculate 290 the total of all user's permissions. This can be normalized to the risk assessment values domain to obtain a user risk score 295. The user risk score can be defined as the mean of all the access risks of a user in range of [0,100]. The user risk score can be calculated, in some embodiments, as (Sum of all user's Access Risks/sum of all Access Risks)*100.

Such risk assessment can give the ability to observe and identify high value users in terms of their access privileges, in some embodiments. Such risk assessment can provide a way to determine if a user really should have all the permissions available to the user.

In case of a known compromise (stolen creds, token, social engineering), some embodiments of the systems and methods described herein can provide an ability to immediately identify the part of the system that is at risk, and in what priority, to perform counter measures with minimum business disruption. Some embodiments of the systems and methods described herein can give the ability to sort all the access risks of the user, in case of a user identity compromise, in order to provide better response for security analysis, and to focus on the highest assets at risk. Using users risk score, some embodiments of the systems and methods described herein can flag privileged users that might be required to have extra authentication levels, and/or more advanced monitoring capabilities. Some embodiments of the systems and methods described herein can build an automation policy driven response for a user based on his/her/its risk score and the assets accessible by him/her/it.

Figure 3:
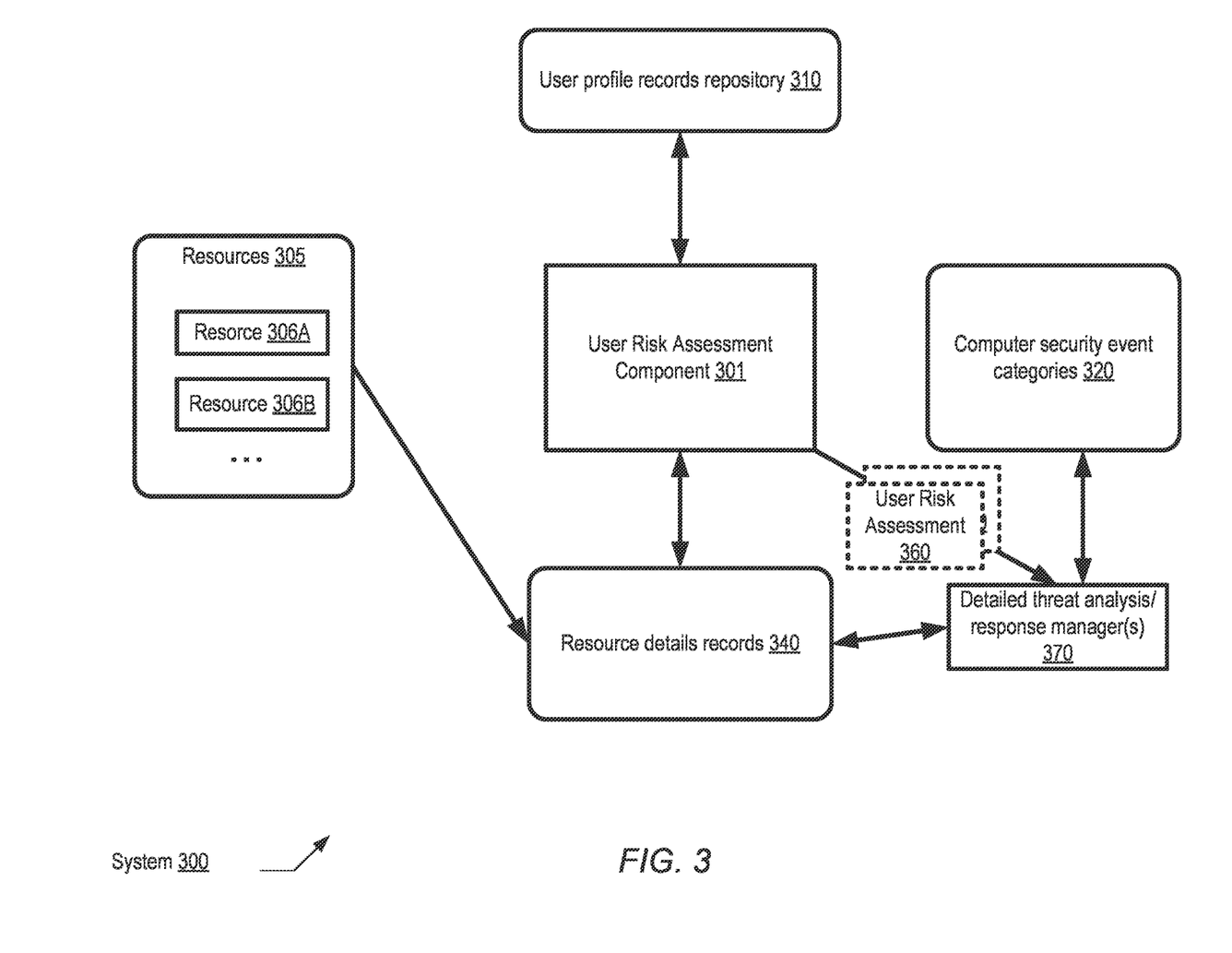
FIG. 3 is a diagram illustrating an example of an architecture usable for risk assessment of user accesses to data resources, according to some embodiments.

FIG. 3 is a diagram illustrating an example of an architecture usable for risk assessment of user accesses to data resources, according to some embodiments. As shown, system 300 includes a set of resources 305 including a plurality of resources (e.g., resources 306A, 306B etc.) which may include proprietary or confidential information about the organization. A number of different kinds of resources may be included in the set of resources 305 in different embodiments, such as HR (human resources) records, intellectual property assets (e.g., trade secrets or invention designs), software programs, business negotiation or contract-related documents and the like. The organization may have a set of security policies to protect its data resources, and the detection of violations of the security policies may be implemented using a number of repositories of information vectors in the depicted embodiment.

Computer security event categories 320 may contain representations of behaviors (e.g., known compromises, employee behavior, and/or behavior of automated programs) that have been found to be correlated with, or indicative of, security events or data compromises. In some embodiments, the computer security event categories may be populated based on root cause analysis of various security attacks directed at the organization, while in other embodiments at least some computer security event categories may be derived from published reports generated by security consortia, government agencies and the like. The event categories stored in the computer security event categories may include, for example, known compromises, unusual or anomalous amounts of data transfer, repeated attempts to access objects without the required permissions, extensive use of unusual data transfer mechanisms (such as universal serial bus (USB) drives), and so on.

In the embodiment depicted in FIG. 3, user profile records repository 310 may include respective records for various employees and/or programs of the organization. Each user may be assigned some set of roles and responsibilities—for example, some employees may be permitted to access trade secrets or proprietary designs of the organization, others may be granted access to HR records and so on. In addition, metadata such as normal working hours in the case of employees, or schedules in the case of iterative programs, may be stored in user profile records repository 310 in various embodiments. In at least one embodiment, a risk metric may be assigned to various users in their profiles, e.g., based on the anticipated extent of the damage that may be caused to the organization if the user's account is involved in a security event or data compromise.

A user risk assessment component 301 may be configured to use the information stored in the user profile records repository 310, together with resource details records 340 associated with the data resources 306, to determine a user risk assessment 360. The detailed threat analysis/response manager(s) 370 can use the user risk assessment 360, and/or the computer security event categories 320 to determine whether the access behavior of one or more users represents a potential or actual security threat in the depicted embodiment, in some embodiments. In at least some embodiments, the user risk assessment component may perform a sequence of threat analysis iterations. In a given iteration, the user risk assessment component may examine a set of resource details records 340 corresponding to some selected time periods. In one part of the analysis, the user risk assessment component 301 may for example determine whether any of the accesses recorded in the resource details records of the current iteration represent unauthorized or illegitimate accesses. In another part of the analysis, the detailed threat analysis/response manager(s) 370 may attempt to determine whether any of the access behaviors indicated in the resource details records match or overlap with one or more computer security event categories of the computer security event categories 320. In some implementations, the set of resource details records analyzed for detecting illegitimate accesses may differ from the set analyzed for computer security event categories.

Results of the user risk assessment-based analysis and/or the computer security event categories-based analysis may be combined and/or weighted based on risk level assessments (e.g., obtained from the user profile records of the users involved, and/or sensitivity metrics of the resources involved). During each iteration, the user risk assessment component may generate a user risk assessment 360 of potential threats. In some embodiments, the lists may be provided to other security management components of system 300, such as detailed threat analysis managers 370 or response managers 370. The response manager 370 can take responsive actions. For example, it may initiate a detailed verification procedure to confirm the presence of the threat, initiate responsive actions such as disabling network accesses to a particular set of resources, changing permissions on one or more data resources, and/or the informing other components of a security management system that are configured to perform detailed verification and/or responsive actions. Whichever entity performers the responsive actions, a wide variety of responsive actions may be taken in different embodiments, such as the disabling of one or more network paths used to access the artifacts, the revocation of access rights to one or more data artifacts, the transmission of warnings, and/or the initiation of disciplinary actions with respect to the offending user accounts.

In other embodiments, the user risk assessment component may itself initiate some responsive actions, e.g., by disabling network accesses to one or more data resources 306, changing permissions on one or more data resources 306, and so on. In one embodiment, the user risk assessment component 301 may generate a score indicative of whether a given set of actual accesses indicated in the resource details records represents an attempted security breach, and the user risk assessment component 301 or the response manager 370 may take further actions (e.g., initiating responses, or informing other response managers) only if the score exceeds a threshold. In another embodiment, the detailed threat analysis managers 370 and/or response managers 370 may generate a score indicative of whether a given set of actual accesses indicated in the resource details records represents an attempted security breach, and may take further actions (e.g., initiating responses, or informing other response managers) only if the score exceeds a threshold.

In some embodiments, the user risk assessment component may perform its analysis in a conditional workflow—e.g., if a first level of analysis of a given set of resource details records 340 appears to be abnormal, a second level of analysis involving the computer security event categories may be triggered, or vice versa. In other embodiments, each of the different types of analysis may be performed independently and the results of the different analysis may be combined to determine the final actions taken by the response managers 370 during a given iteration. In some embodiments, iterations of the detailed threat analysis manager(s) 370 operations may be scheduled at regular or fixed intervals (e.g., once every X minutes), while in other embodiments, the iterations may be triggered only when specified events occur—e.g., when data transfers are detected from a particular resource storage device.

A number of programmatic interfaces may be established for the use and administration of the risk assessment of user accesses to data resources system in various embodiments. For example, in one embodiment, each of the repositories illustrated in FIG. 3 may have its own web-based console, APIs, command line tools and/or custom GUIs (graphical user interfaces). Such interfaces may be used, for example, by HR personnel and/or IT personnel to enter user profile record information, or by automated tools to store records in the repositories. In some embodiments, subjective assessments of the psychological states of various employees may also be entered programmatically, e.g., in response to complaints lodged by one employee regarding another or in response to reported unusual mannerisms or behaviors. Programmatic interfaces may also be used to enter computer security event categories, e.g., by human administrators of the system 300 and/or by expert systems or machine learning engines. In various embodiments, a number of resource details collectors may use programmatic interfaces to transmit log records for analysis by the user risk assessment component 301 and/or the detailed threat analysis managers 370.

The components of the system for risk assessment of user accesses to data resources shown in FIG. 3 may be distributed across a variety of locations in some embodiments. For example, in one scenario the resources 306 may be stored at least temporarily at various storage resources of a provider network and/or at customer premises, and corresponding resource details may be collected at each of the locations. A multi-tiered analysis approach may be used in some embodiments, in which local user risk assessment components 301 operate on respective resource details records at each of several location, and the results of the local analysis are then transmitted to aggregating user risk assessment components at higher level, until an organization-level analysis is eventually performed. In such scenarios, the lower tiers of analysis may represent a filter through which only those threat candidates which meet a threshold risk level criterion are passed up to the higher tiers. In some embodiments, the resource details records may be sorted by the user risk assessment components, e.g., based on the levels of risk associated with the users and resources, so that the accesses which may have the greatest negative impacts are examined earliest.

Figure 4:
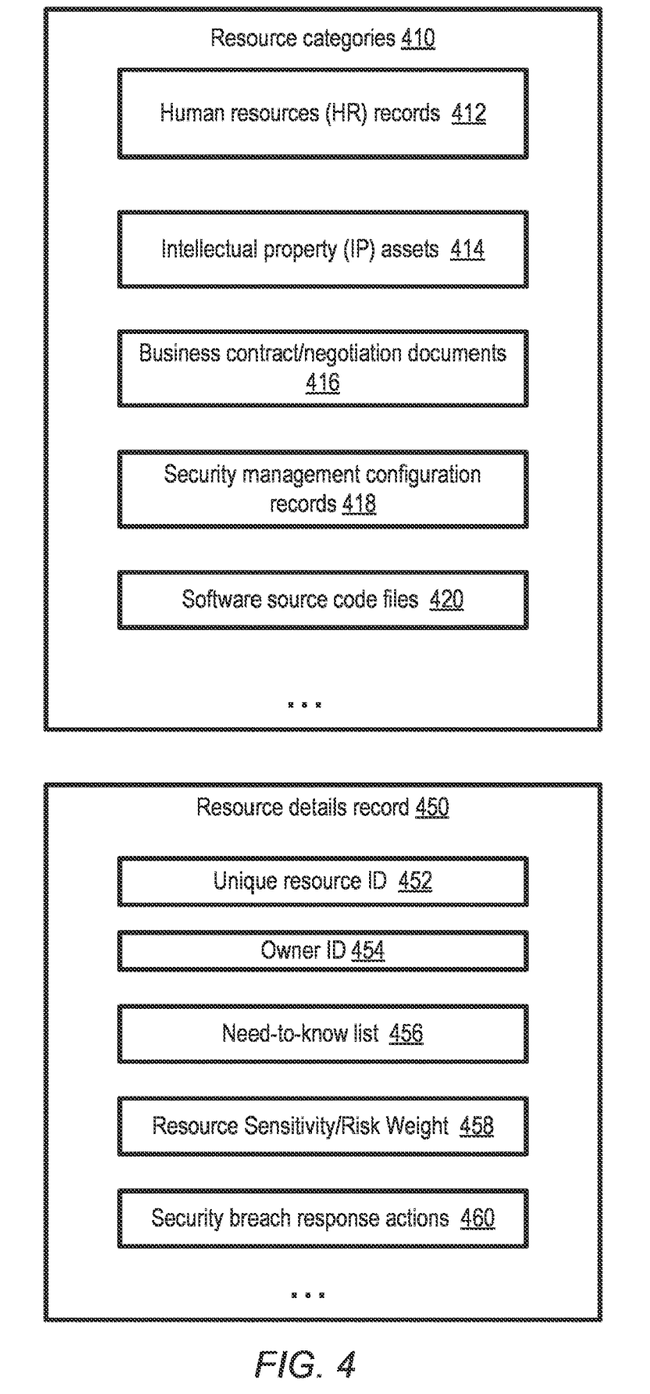
FIG. 4 illustrates example categories of security sensitive resources and the corresponding metadata that may be maintained by the systems and methods for risk assessment of user accesses to data resources, according to at least some embodiments.

FIG. 4 illustrates example categories of security sensitive resources and the corresponding metadata that may be maintained by the systems and methods for risk assessment of user accesses to data resources, according to at least some embodiments. As shown, resource categories 410 may include, among others, human resources (HR) records 412, intellectual property assets 414, business contract/negotiation records 416, security management configuration records 416 (e.g., configuration files for firewalls, resource details, and the like), software source code files 420, and the like. Each type of resource may be stored in a respective type of repository in various embodiments—for example, a relational database may be used for HR records, a source code management system may be used for program code files, emails stored at an electronic mail server's file system may contain some business records, and so on. In large organizations, the number of resources that contain sensitive information may number in the hundreds of thousands, and may be widely dispersed across one or more physical premises or data centers. Generating a list of resources to be protected against potential security events or data compromises, and keeping such a list up-to-date, may itself require a significant effort within large organizations. In some embodiments, all the data resources produced or generated within an organization may be considered security-sensitive by default—that is, an effort to distinguish sensitive data resources from resources which cannot be used for breaching security policies may not necessarily be required.

Corresponding to some or all data resources belonging to one or more of the categories 410, one or more elements of metadata may be maintained in respective resource details records 450 in some embodiments. A resource details record may include, for example, a unique resource identifier 452, an owner identifier 454, a need-to-know list 456, a resource sensitivity or risk level weight 458, and one or more security breach response actions 460. As in FIG. 2, the resource sensitivity/risk weight can be defined as a numeric score in a certain range, for example [1,X]. It can be an integer number set to represent the risk weight of the resource. The higher the number the riskier is the resource in overall business view in case of compromise. The owner identifier 454 may be used to notify the appropriate party when the resource is accessed in an unauthorized manner, for example. Need-to-know list 456 may indicate those users which are to be permitted to read and/or write certain types of resources. The resource sensitivity/risk weight 458 may be assigned subjectively in some embodiments, e.g., with the help of the resource owners and/or the management personnel of the organization. Response actions 460 may indicate what kinds of recovery operations should be performed if and when the data resource is accessed as part of a security attack, or when an attempt to access the data resource is made. In various embodiments, some or all of the kinds of metadata indicated in FIG. 4 may be stored in other formats, instead of or in addition to being stored in resource details records used by the system for risk assessment of user accesses to data resources. For example, the logical equivalents of need-to-know lists 456 may be obtained by examining access control lists (ACLs) or read-write permissions associated with the files or database entries used for the resources. In some embodiments, resource details records or their equivalents may be used by the system for risk assessment of user accesses to data resources.

Figure 5:
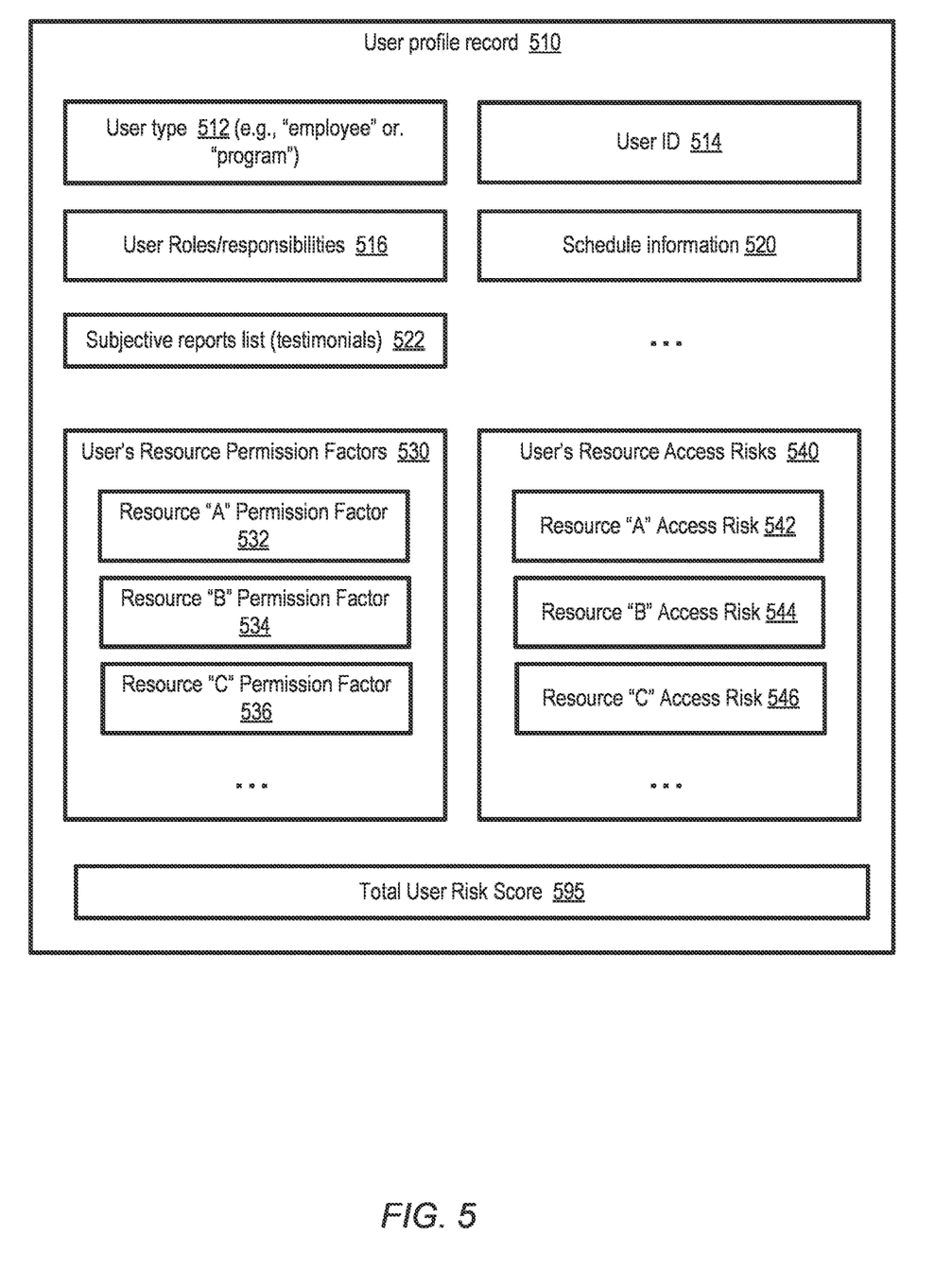
FIG. 5 illustrates example elements of user profile records which may be used by the systems and methods for risk assessment of user accesses to data resources, according to at least some embodiments.

FIG. 5 illustrates example elements of user profile records which may be used by the systems and methods for risk assessment of user accesses to data resources, according to at least some embodiments. A given user profile record 510 may include, for example, an indication of a user type 512—e.g., whether the user is an employee or a program/script. An identifier 514 for the user may be used, for example by the user risk assessment component 301 or the detailed threat analysis manager(s) 370, to identify the particular subset of resource details entries which indicate accesses attempted or completed by the user. In some embodiments, at least some of the entries may not contain user identifiers in the same form as indicated in the user profile records-instead, for example, an entry may indicate an IP address of a computer from which an access request was received, and the user risk assessment component 301 and/or the detailed threat analysis manager(s) 370 may use other metadata (e.g., a mapping of employees to the IP addresses assigned to their workstations) to map users to their resource details entries.

Roles and responsibilities assigned to the user may be indicated in element 516 in the depicted embodiment, and may be used to correlate users and to their roles and responsibilities. In at least some embodiments, schedule information 520 may be stored for at least some users in their respective profiles, indicating for example the normal working hours (in the case of employees) or the hours at which the program is typically executed (in the case of programs). In one embodiment, the organization may also store records of subjective reports 522 regarding various employees—e.g., if one employee E1 reports another employee E2's unusual behavior, such a record may be stored in the profile of E2 (while ensuring that privacy and confidentiality policies of the organization are complied with). Such subjective reports, which may also be referred to as testimonials, may sometimes be helpful in analyzing the access behavior of the employee.

In at least some embodiments one or more metrics indicative of the risk associated with security breaches in which the user's profile might be a participant may be stored in the profile records, e.g., in the form of user's resource permission factors 530 and user's resources access risks 540. A risk calculator can assign permission factors (532, 534, 536) that are calculated based on the user's access permissions to various resources. A permission factor can be defined as a numeric score in a certain range, for example [1,X]. It can be a continuous value. The permission factor value can indicate the weight of the user's access permission on the resource, for example a permission to modify can have higher value than a permission to view. Resource "A" permission factor 532 indicates the weight of the user's access permission on resource A. Resource "B" permission factor 534 indicates the weight of the user's access permission on resource B. Resource "C" permission factor 536 indicates the weight of the user's access permission on resource C.

A risk calculator can then determine the user's resource access risks 540 of a user's access permission on a resource. The access risk (542, 544, 546) can be the total weight of a certain permission on a certain resource that takes into account which actions are permitted on the resource and the resource security score. The access risk can be calculated, in some embodiments, as the product of (Permission factor*Resource weight). For example, resource "A" access risk 542 can be calculated as the resource "A" permission factor 532 multiplied by the resource weight 458 of resource "A". As another example, resource "B" access risk 544 can be calculated as the resource "B" permission factor 534 multiplied by the resource weight 458 of resource "B". As another example, resource "C" access risk 546 can be calculated as the resource "C" permission factor 536 multiplied by the resource weight 458 of resource "C".

A risk calculator can then calculate the total of all user's permissions. This can be normalized to the risk assessment values domain to obtain a total user risk score 595. The total user risk score 595 can be defined as the mean of all the access risks of a user in range of [0,100]. The user risk score can be calculated, in some embodiments, as (Sum of all user's Resource Access Risks 540/sum of all Access Risks) *100. The sum of all Access Risks can be calculated by assuming that the user has full access to each of the user's resources, in some embodiments. This can be calculated, in some embodiments, by setting the resource permission factors to the maximum value, for each of the resources that the user has access to, and then multiplying each maximum resource permission factor by the resource weight of each of the resources, and summing all the products together. In other embodiments, the sum of all Access Risks can be calculated by assuming that the user has full access to all the resources in the system, by setting the resource permission factors for each resource in the system to the maximum value, and then multiplying each maximum resource permission factor by the resource weight of each of the resources, and summing all the products together.

The more sensitive the data resources to which the user is provided access, as determined for example by some security or management personnel of the organization, the higher the user's resource access risks 540, and the higher the total user risk score 595 may be set in at least some embodiments. Risk metrics, such as the user's resource access risks 540 and the total user risk score 595, may be used as relative weights to be attached to the results of the analysis conducted by the user risk assessment component 301 and/or the detailed threat analysis manager(s) 370 in some embodiments. For example, if two sets of accesses, one by user E1's account and one by user E2's account, appear to indicate security threats, but the total user risk score 595 of E1 is double the total user risk score 595 of E2, the user risk assessment component 301 and/or the detailed threat analysis manager(s) 370 may prioritize responses to E1's security threat higher than the responses to S2's security threats.

Figure 6:
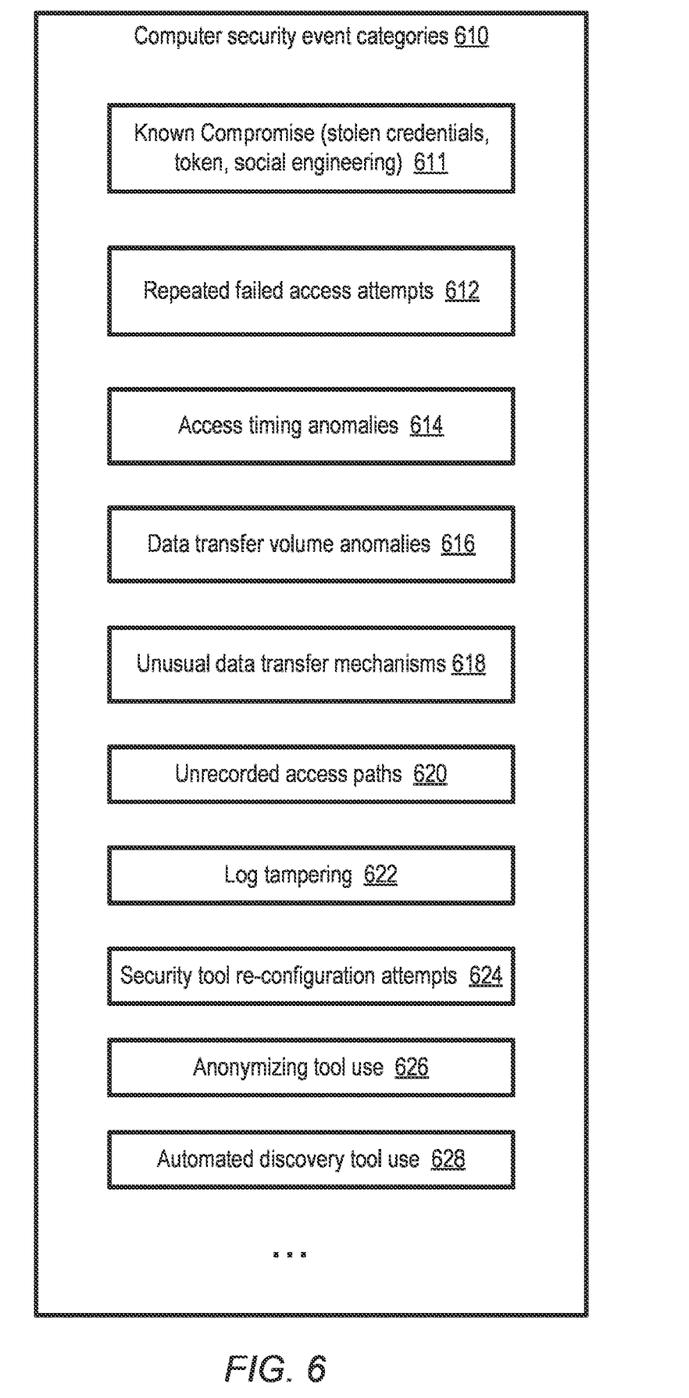
FIG. 6 illustrates example categories of computer security events which may be used to detect potential threats, according to at least some embodiments.

FIG. 6 illustrates example categories of computer security events which may be used to detect potential threats, according to at least some embodiments. As mentioned earlier, a user risk assessment component 301 and/or the detailed threat analysis manager(s) 370 may consult the computer security event categories 610 to determine whether the accesses directed at one or more resources represent a pattern of behavior associated with security events or data compromises. FIG. 6 illustrates example categories of computer security events which may be used to detect potential security events or data compromises, according to at least some embodiments. Suspect behavior template categories 610 may include, among others, known compromises 611, repeated failed access attempts 612, access timing anomalies 614, data transfer volume anomalies 616, unusual data transfer mechanisms 618, use of unrecorded access paths 620, log tampering 622, security tool re-configuration attempts 624, anonymizing tool use 626 and/or automated discovery tool use 628 in the depicted embodiment. In some embodiments, the kinds of templates shown in FIG. 6 may be entered into the computer security event categories using programmatic interfaces by security experts, e.g., based on published research. In other embodiments, at least some suspect event categories may be generated automatically, e.g., based on correlation or other types of data analysis conducted using machine learning or artificial intelligence-related techniques.

The known compromises 611 can include stolen credentials, a stolen or forged token, or social engineering schemes that trick a user into revealing his/her password or security credentials. However many security events or data compromises on sensitive data may be foreshadowed by failed attempts to access the data, and records of persistent unsuccessful efforts to gain access may therefore serve as a useful pattern 612 to be matched by the user risk assessment component 301 and/or the detailed threat analysis manager(s) 370 to identify possible security events or data compromises. In some embodiments, the system for risk assessment of user accesses to data resources may be provided with information regarding scheduling and timing of various legitimate accesses to sensitive data resources—e.g., HR records stored in a particular database may typically be accessed only during normal office hours of 8 AM-5 PM in some organizations. If accesses (even authorized accesses) to the HR records are attempted frequently outside the normal office hours, this may represent an example of access timing anomalies 614, which may also potentially indicate a security threat. If an account associated with an employee or program typically transfers no more than X megabytes of data per day to or from some set of resources, but appears to be transferring 10X or 100X megabytes during one or more otherwise normal days, this may represent a data transfer volume anomaly 616 which could also suggest that some kind of attack is being attempted. If most of an organization's legitimate data transfer typically occurs over one or more networks, but a given user's account appears to be transferring data using a USB device or using unauthorized/personal cloud-based storage, this may represent the use of unusual data transfer mechanisms 618, and may also represent a possible attack pathway.

If resource details indicate that a particular resource is accessed successfully via an unrecorded pathway, this use of an unrecorded access path 620 may in itself be considered a security threat, or at least may point out a possible weakness in the security policies or the access path generating techniques being used. If a user (e.g., an individual or program) is found to be tampering (or attempting to tamper with) various types of system-generated logs (template 622), or attempting to change the configuration of one or more security tools (template 624), these actions may be tagged by the user risk assessment component 301 and/or the detailed threat analysis manager(s) 370 as being indicative of attempted security breaches in at least some embodiments. The use of anonymizing tools 626 (e.g., tools that obfuscate an email's sender address, or change the network address or domain from which an HTTP request appears to originate) and/or automated discovery tools (such as web crawlers) may constitute other examples of suspect behavior patterns which a user risk assessment component 301 and/or the detailed threat analysis manager(s) 370 may attempt to match in various embodiments. Other types of computer security events may be included in the computer security event categories 610 in some embodiments, while some of the templates listed in FIG. 6 may not be used in at least one embodiment. In some embodiments, the computer security event categories may also include programmatic instructions or guidelines indicating how a user risk assessment component 301 and/or the detailed threat analysis manager(s) 370 should attempt to detect matches between the computer security event categories and the resource details records— e.g., how many successive failed access attempts constitute a potential threat, which particular re-configuration attempts should be considered predictive of security attacks, and so on.

Figure 7:
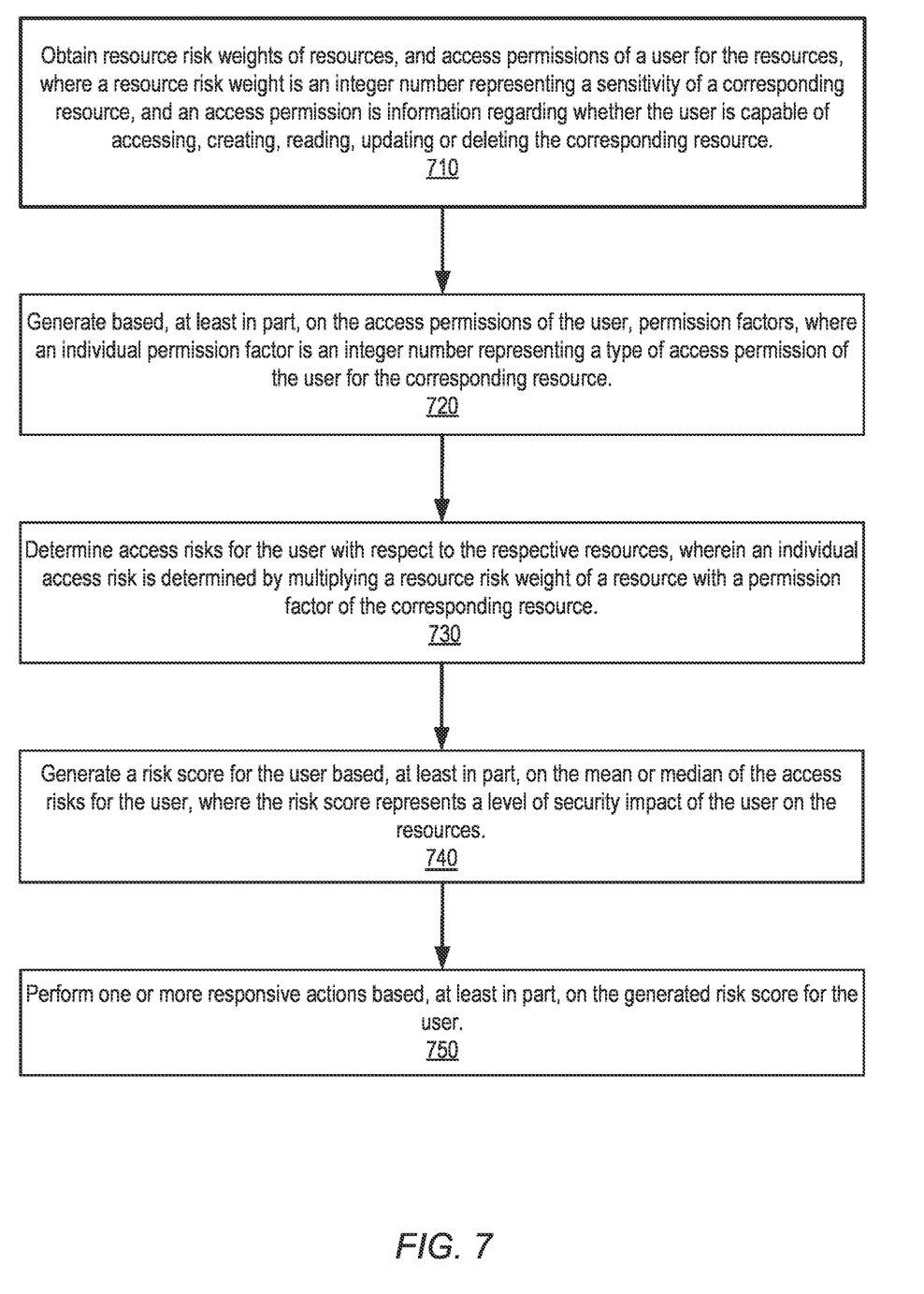
FIG. 7 is a flow diagram illustrating aspects of operations that may be performed to perform a method for risk assessment of user accesses to data resources, according to at least some embodiments.

FIG. 7 is a flow diagram illustrating aspects of operations that may be performed to perform a method for risk assessment of user accesses to data resources, according to at least some embodiments.

FIG. 7 begins at block 710 which obtains resource risk weights of resources, and access permissions of a user for the resources, where a resource risk weight is an integer number representing a sensitivity of a corresponding resource, and an access permission is information regarding whether the user is capable of accessing, creating, reading, updating or deleting the corresponding resource. The flowchart transitions then to block 720 which generates based, at least in part, on the access permissions of the user, permission factors, where an individual permission factor is an integer number representing a type of access permission of the user for the corresponding resource.

From block 720 the flowchart transitions to block 730 that determines access risks for the user with respect to the respective resources, where an individual access risk is determined by multiplying a resource risk weight of a resource with a permission factor of the corresponding resource. Then, at 740, the method generates a risk score for the user based, at least in part, on the mean or median of the access risks for the user, where the risk score represents a level of security impact of the user on the plurality of resources. Finally, at 750, one or more responsive actions based, at least in part, on the generated risk score for the user are performed.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, wherein the memory comprises program instructions stored thereon that, upon execution by the processor, cause the IHS to:
obtain a plurality of resource risk weights of a respective plurality of resources, and a plurality of access permissions of a user for the respective plurality of resources;
generate based, at least in part, on the plurality of resource risk weights and the plurality of access permissions of the user, a risk score for the user that represents a level of security impact of the user on the plurality of resources; and
perform one or more responsive actions based, at least in part, on the generated risk score;
wherein to generate the risk score for the user, the program instructions, upon execution by the processor, further cause the IHS to:
generate based, at least in part, on the plurality of access permissions of the user, a plurality of permission factors, wherein an individual permission factor comprises an integer number representing a type of access permission of the user for a respective resource of the plurality of resources;
determine a plurality of access risks for the user with respect to the respective plurality of resources; and
generate the risk score for the user based, at least in part, on the mean or median of the plurality of access risks for the user.

2. The IHS of claim 1, wherein the one or more responsive actions are performed responsive to a detection of a security event or a data compromise.

3. The IHS of claim 1, wherein the one or more responsive actions comprise recommending that extra authentication levels be added for the user, or recommending that additional monitoring be performed on the user.

4. The IHS of claim 1, wherein the one or more responsive actions comprise an initiation of a detailed verification procedure to confirm the presence of a threat.

5. The IHS of claim 1, wherein the one or more responsive actions comprise a disabling of one or more network paths used to access one or more of the plurality of resources.

6. The IHS of claim 1, wherein the one or more responsive actions comprise a changing of one or more of the plurality of access permissions of the user for one or more of the plurality of resources, or a revocation of access rights of the user to one or more of the plurality of resources.

7. The IHS of claim 1, wherein the one or more responsive actions comprise a transmission of one or more warnings to the user or to a system administrator.

8. The IHS of claim 1, wherein the risk score identifies one or more resources of the plurality of resources to prioritize for one or more responsive actions.

9. The IHS of claim 1, wherein an individual resource risk weight of the plurality of resource risk weights comprises an integer number representing a sensitivity of a corresponding resource of the plurality of resources.

10. The IHS of claim 1, wherein an individual access permission of the plurality of access permissions for a resource of the plurality of resources comprises information regarding whether the user is capable of accessing, creating, reading, updating, or deleting the resource.

11. The IHS of claim 1, wherein
the risk score is generated based further, at least in part, on the plurality of permission factors.

12. The IHS of claim 1, wherein an individual access risk of the plurality of access risks is determined by multiplying a resource risk weight of a respective resource by a permission factor of the respective resource.

13. A method, comprising:
obtaining a plurality of resource risk weights of a respective plurality of resources, and a plurality of access permissions of a user for the respective plurality of resources;
generating based, at least in part, on the plurality of resource risk weights and the plurality of access permissions of the user, a risk score for the user that represents a level of security impact of the user on the plurality of resources; and
performing one or more responsive actions based, at least in part, on the generated risk score;
wherein generating the risk score for the user further comprises:
generating based, at least in part, on the plurality of access permissions of the user, a plurality of permission factors, wherein an individual permission factor comprises an integer number representing a type of access permission of the user for a respective resource of the plurality of resources;
determining a plurality of access risks for the user with respect to the respective plurality of resources; and
generating the risk score for the user based, at least in part, on the mean or median of the plurality of access risks for the user.

14. The method of claim 13, further comprising:
    detecting a security event or a data compromise;
    wherein performing the one or more responsive actions is in response to the detecting.

15. The method of claim 14, wherein performing the one or more responsive actions further comprises performing one or more of:
    adding authentication levels for the user;
    performing additional monitoring on the user;
    initiating a detailed verification procedure to confirm the presence of a threat;
    disabling one or more network paths used to access one or more of the plurality of resources;
    changing one or more of the plurality of access permissions of the user for one or more of the plurality of resources;
    revoking access rights of the user to one or more of the plurality of resources; or
    transmitting one or more warnings to the user or to a system administrator.

16. The method of claim 13, wherein an individual access risk of the plurality of access risks is determined by multiplying a resource risk weight of a respective resource by a permission factor of the respective resource.

17. The method of claim 13, wherein the generating of the risk score is further based, at least in part, on the plurality of permission factors.

18. One or more non-transitory computer-readable storage media storing program instructions, that when executed on or across one or more processors, cause the one or more processors to:
    obtain a plurality of resource risk weights of a respective plurality of resources, and a plurality of access permissions of a user for the respective plurality of resources;
    generate based, at least in part, on the plurality of resource risk weights and the plurality of access permissions of the user, a risk score for the user that represents a level of security impact of the user on the plurality of resources; and
    perform one or more responsive actions based, at least in part, on the generated risk score;
    wherein to generate the risk score for the user, the program instructions, when executed on or across the one or more processors, further cause the one or more processors to:
        generate based, at least in part, on the plurality of access permissions of the user, a plurality of permission factors, wherein an individual permission factor comprises an integer number representing a type of access permission of the user for a respective resource of the plurality of resources;
        determine a plurality of access risks for the user with respect to the respective plurality of resources; and
        generate the risk score for the user based, at least in part, on the mean or median of the plurality of access risks for the user.

* * * * *